US012245340B2

(12) United States Patent
Etzkorn et al.

(10) Patent No.: US 12,245,340 B2
(45) Date of Patent: Mar. 4, 2025

(54) HEATING PLATE AND FLOW HEATER HAVING HEATING PLATE

(71) Applicant: BorgWarner Ludwigsburg GmbH, Ludwigsburg (DE)

(72) Inventors: Hans-Peter Etzkorn, Bruchsal (DE); Gerd Bräuchle, Hüffenhardt (DE)

(73) Assignee: BorgWarner Ludwigsburg GmbH, Ludwigsburg (DE)

( * ) Notice: Subject to any disclaimer, the term of this patent is extended or adjusted under 35 U.S.C. 154(b) by 113 days.

(21) Appl. No.: 17/063,197

(22) Filed: Oct. 5, 2020

(65) Prior Publication Data

US 2021/0108830 A1 Apr. 15, 2021

(30) Foreign Application Priority Data

Oct. 10, 2019 (DE) ..................... 10 2019 127 324.2

(51) Int. Cl.
*H05B 3/26* (2006.01)
*F24H 1/00* (2022.01)
*F24H 9/1818* (2022.01)

(52) U.S. Cl.
CPC ........... *H05B 3/262* (2013.01); *F24H 9/1818* (2013.01); *F24H 1/009* (2013.01); *H05B 2203/003* (2013.01); *H05B 2203/021* (2013.01)

(58) Field of Classification Search
CPC .... F24H 9/1818; F24H 9/2014; F24H 9/2028; F24H 1/009; F24H 1/101; F24H 1/103; H05B 3/262; H05B 2203/003; H05B 2203/021
See application file for complete search history.

(56) References Cited

U.S. PATENT DOCUMENTS

| | | | | |
|---|---|---|---|---|
| 5,874,712 | A * | 2/1999 | Toth | H05B 3/36 219/535 |
| 7,645,963 | B2 | 1/2010 | Werkman et al. | |
| 9,338,825 | B2 * | 5/2016 | Bulgajewski | H01Q 1/22 |
| 2009/0107988 | A1 * | 4/2009 | Kaastra | C03C 8/16 374/185 |
| 2012/0267355 | A1 * | 10/2012 | Trapp | H05B 3/265 219/202 |
| 2013/0213950 | A1 * | 8/2013 | Bulgajewski | H05B 1/00 219/209 |
| 2016/0060871 | A1 * | 3/2016 | Kulkarni | H05B 1/0252 219/528 |
| 2018/0093455 | A1 * | 4/2018 | Zou | H05B 3/34 |
| 2018/0160480 | A1 * | 6/2018 | Bohlender | H05B 3/06 |
| 2019/0037644 | A1 * | 1/2019 | Kim | H05B 1/0294 |
| 2019/0077224 | A1 | 3/2019 | McCarthy et al. | |
| 2019/0385768 | A1 * | 12/2019 | Steinberger | H01C 7/025 |

FOREIGN PATENT DOCUMENTS

| | | | |
|---|---|---|---|
| DE | 10 2017 121 341 | A1 | 3/2019 |
| EP | 1 566 078 | B1 | 9/2006 |

* cited by examiner

*Primary Examiner* — Thor S Campbell
(74) *Attorney, Agent, or Firm* — Bose McKinney& Evans LLP

(57) ABSTRACT

Described is a heating plate having a substrate made of metal, a heating layer and an insulation layer which is arranged between the heating layer and the substrate. It is provided according to this disclosure that the insulation layer bears an electrically conductive shielding layer and that the shielding layer is covered by a second insulation layer on which the heating layer lies. In addition, a flow heater having such a heating plate is disclosed.

12 Claims, 2 Drawing Sheets

HEATING PLATE AND FLOW HEATER HAVING HEATING PLATE

RELATED APPLICATIONS

This application claims priority to DE 10 2019 127 324.2, filed Oct. 10, 2019, the entire disclosure of which is hereby incorporated herein by reference.

BACKGROUND

This disclosure refers to a heating plate of the type generally described in EP 1 566 078 B1. Such heating plates are used in flow heaters in vehicles, as disclosed, for example, in DE 10 2017 121 341 A1.

Heating plates or heating devices containing heating plates are increasingly used in vehicles having pulse-width modulation at high voltages of up to 400 V and more. It is therefore becoming increasingly difficult to meet conventional requirements for electromagnetic compatibility in vehicles.

SUMMARY

This disclosure teaches how the electromagnetic compatibility of heating plates or heating devices containing heating plates can be fulfilled more economically.

In a heating plate according to this disclosure, an electrically conductive shielding layer is arranged between the substrate and the heating layer. A first insulation layer thus lies on the substrate, the insulation layer being covered by the shielding layer. The shielding layer bears a second insulation layer on which the heating layer is arranged. Surprisingly, the electromagnetic compatibility of the heating plate or a heating device equipped therewith can be significantly improved.

In a conventional heating plate, the heating layer forms a capacitance to the substrate. An interference current therefore occurs in pulse-width-modulated operation with a high pulse frequency and high voltage, the interference current flowing from the heating layer to the substrate and from there flowing uncontrollably to other system components, for example, a housing.

Problems based on this interference current can be largely eliminated using a heating plate according to this disclosure by placing the shielding layer at a suitable potential, e.g., ground, for example, by means of an electrically conductive connection to a ground connection of a control of a heating device which contains the heating plate. The interference current from the heating layer to the shielding layer can thus be dissipated via a suitable contacting of the shielding layer.

An advantageous refinement of this disclosure provides that the substrate is a metal plate, for example, made of steel. The substrate of a heating plate according to this disclosure can be sheet metal and can therefore be produced inexpensively.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following description. Rather, the embodiments are chosen and described so that others skilled in the art may appreciate and understand the principles and practices of this disclosure.

Figure 1:
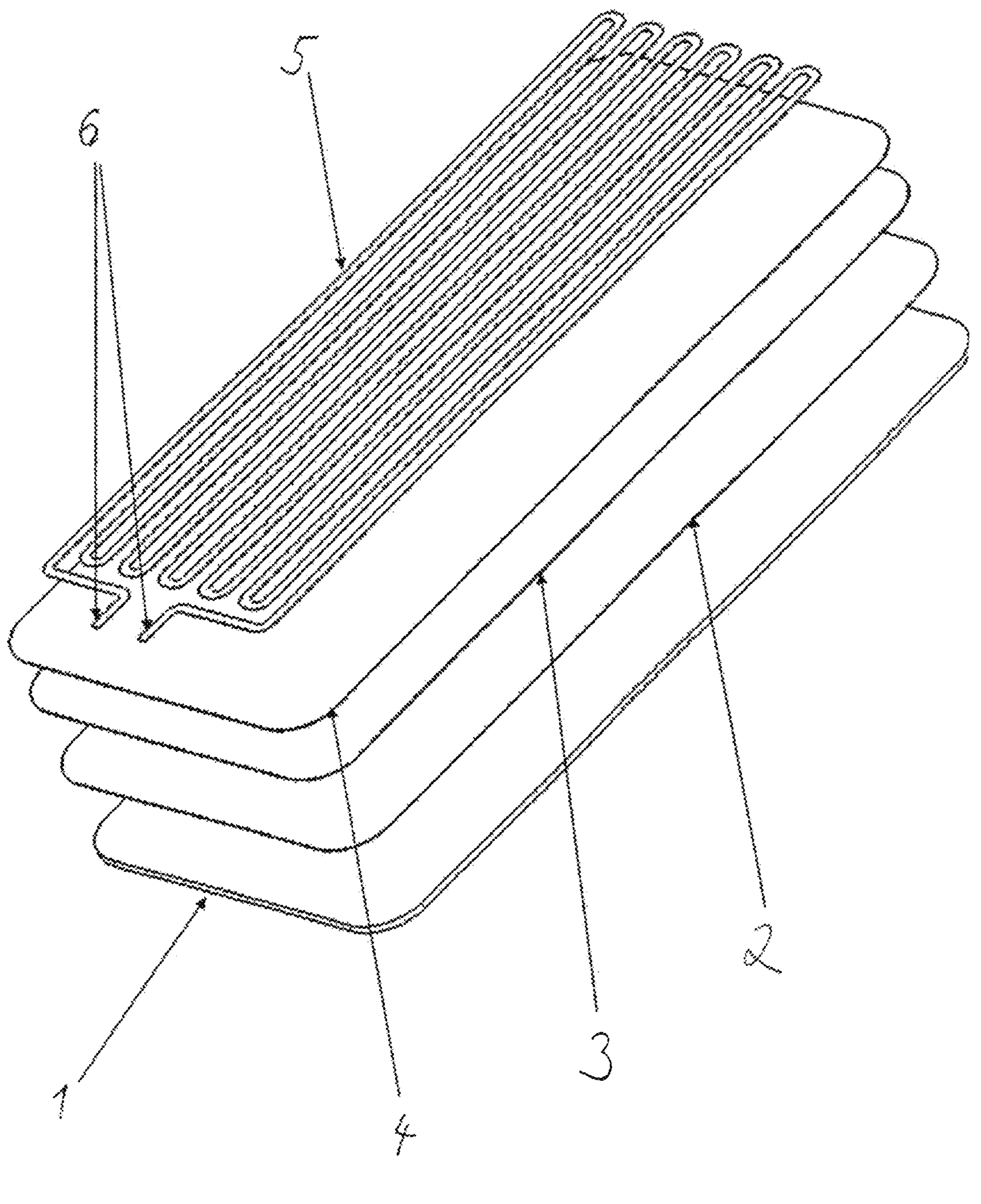
FIG. 1 is an embodiment of a heating plate in an exploded view.

The heating plate shown in an exploded view in FIG. 1 comprises a substrate 1 made of metal, for example, made of steel or aluminum, which bears an insulation layer 2, for example, an enamel or ceramic layer. The insulation layer 2 is covered by a shielding layer 3, for example, a metal layer, for example, made of aluminum. As an alternative to a metal layer, graphite layers, which can be applied, for example, as conductive pastes, can also be used. A second insulation layer 4 lies on the shielding layer 3. The second insulation layer 4 can be designed like the first insulation layer 2 and bears a heating layer 5, e.g., conducting tracks. The heating layer 5 can be printed onto the second insulation layer 4 and is connected at its two ends 6 to a voltage source. The shielding layer 3 can, for example, be printed, for example, by screen printing, or deposited on the insulation layer 2 from the gas phase.

The heating layer 5 may comprise one or more tracks. All tracks of the heating layer 5 are arranged on the second insulation layer 4. In the example shown, the substrate is a plate, for example, made of sheet metal. However, a profile can also be used as the substrate, for example.

The insulation layers 2, 4 and the shielding layer 3 may be closed layers, which completely cover the respective underlying surface. The insulation layers 2, 4 and the shielding layer 3 have essentially the same area, that is, the same size. The heating layer 5, on the other hand, may cover only a relatively small part of the surface of the second insulation layer 4 and can, for example, be designed as a plurality of strips arranged at a distance from one another.

Figure 2:
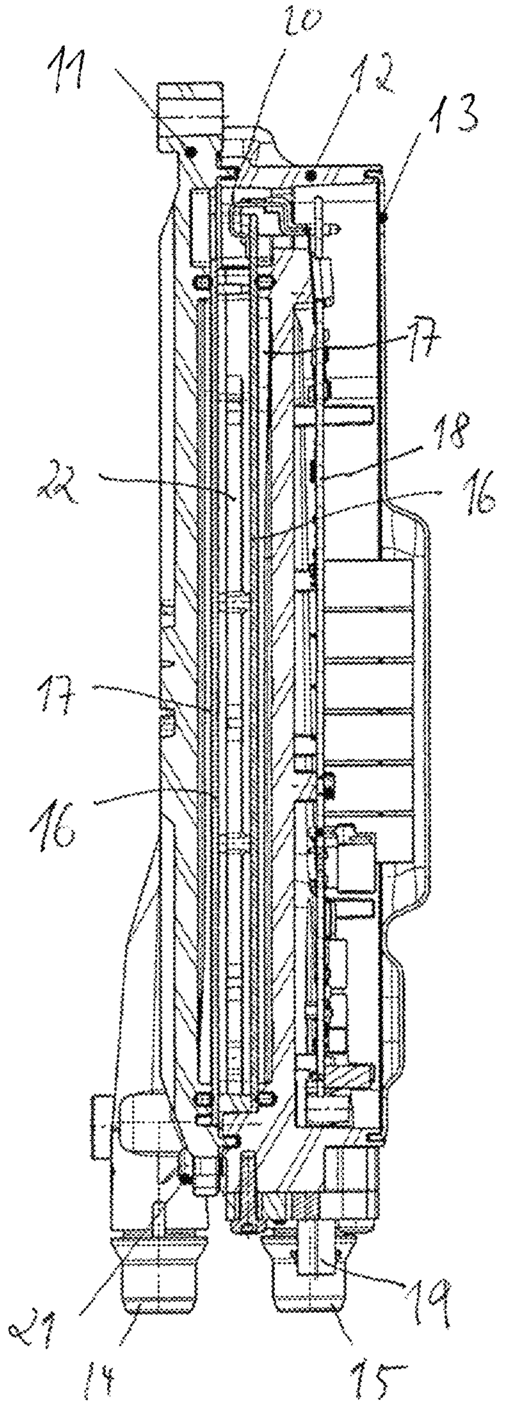
FIG. 2 is an embodiment of a flow heater in a sectional view.

The heating plate shown in FIG. 1 can be used in a flow heater, which is shown in FIG. 2 in a sectional view. This flow heater has a housing which can be assembled from a plurality of parts 11, 12, 13, for example, by means of screws 21. The housing has an inlet opening 14 and an outlet opening 15. Two heating plates 16 are arranged in the housing, the two heating plates each facing one another with their sides bearing heating layers and resting against a spacer 22. The heating plates 16 define a flow path 17 in the housing from the inlet 11 to the outlet 12.

The flow heater contains control electronics 18 which, for example, can be arranged on a printed circuit board. The heating plates 16 are connected to an electrical plug connector 19 via the control electronics 18 and can thus be supplied with voltage. Contacts 20 of the control electronics 18 lead to the ends 6 of the heating layer 5, respectively its tracks. In addition, a suitable connection of the control electronics 18, for example, a ground connection, is electrically conductively connected to the shielding layers 3 of the heating plates 16. To ensure that the flow heater can be operated safely with high voltage, its housing is electrically insulated from the circuit through which the heating current flows. The shielding layer 3 is therefore galvanically separated from the substrate 1.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

LIST OF REFERENCE NUMERALS

1 substrate
2 insulation layer
3 shielding layer
4 insulation layer
5 heating layer
6 ends of tracks of the heating layer
11 housing part
12 housing part
13 housing part
14 inlet opening
15 outlet opening
16 heating plate
17 flow path
18 control electronics
19 plug connector
20 contact
21 screw
22 spacer

What is claimed is:

1. A flow heater, comprising:
a housing having inlet and outlet openings for liquid to be heated;
a heating plate comprising:
a substrate made of metal;
a heating layer;
an insulation layer arranged between the heating layer and the substrate;
the insulation layer bearing an electrically conductive shielding layer, wherein the shielding layer is a closed layer and is disposed between the heating layer and the substrate; and
a second insulation layer on which the heating layer lies, the second insulation layer covering the shielding layer;
wherein, in the flow heater, the shielding layer is galvanically separated from the substrate and current flow from the shielding layer to the substrate is thereby prevented.

2. The heating plate according to claim 1, wherein the substrate is a plate.

3. The heating plate according to claim 1, wherein the substrate is made of steel.

4. The heating plate according to claim 1, wherein the shielding layer is made of metal.

5. The heating plate according to claim 1, wherein the heating layer is imprinted on the second insulation layer.

6. The heating plate according to claim 1, wherein the heating layer comprises conductive tracks.

7. The heating plate according to claim 1, wherein the shielding layer and the insulation layers cover essentially the same area.

8. The heating plate according to claim 1, wherein the shielding layer completely covers the insulation layer.

9. The flow heater according to claim 1, wherein the housing is electrically insulated from the circuit through which the heating current flows.

10. The flow heater according to claim 1, wherein the heating plate comprises a pair of spaced heating plates and the flow pathway extends around the heating plates.

11. The flow heater according to claim 1, wherein the heating plate comprises a pair of heating plates disposed in the flow heater and wherein the heating plates face one another with their sides bearing heating layers and resting against a spacer.

12. A flow heater, comprising:
a housing having inlet and outlet openings for liquid to be heated;
a heating plate comprising:
a substrate made of metal;
a heating layer;
an insulation layer arranged between the heating layer and the substrate;
the insulation layer bearing an electrically conductive shielding layer, wherein the shielding layer is a closed layer and is disposed between the heating layer and the substrate; and
a second insulation layer on which the heating layer lies, the second insulation layer covering the shielding layer;
wherein the flow heater comprises a circuit through which the heating current flows and the housing is electrically insulated from the circuit;
wherein, in the flow heater, the shielding layer is galvanically separated from the substrate and current flow from the shielding layer to the substrate is thereby prevented.

* * * * *